(12) United States Patent
Marur

(10) Patent No.: US 8,478,484 B2
(45) Date of Patent: Jul. 2, 2013

(54) CONTROL OF VEHICLE ROLLOVER

(75) Inventor: Prabhakar R. Marur, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 124 days.

(21) Appl. No.: 13/177,683

(22) Filed: Jul. 7, 2011

(65) Prior Publication Data

US 2013/0013146 A1   Jan. 10, 2013

(51) Int. Cl.
*G06F 7/00* (2006.01)
*G06F 17/00* (2006.01)

(52) U.S. Cl.
USPC .......................................... 701/36; 701/124

(58) Field of Classification Search
USPC ............... 701/36–37, 124; 340/425.5, 429, 340/438, 440, 442; 180/282
See application file for complete search history.

(56) References Cited

U.S. PATENT DOCUMENTS

| 7,467,684 | B2 | 12/2008 | Wang et al. | |
| 7,729,829 | B2 * | 6/2010 | Messih et al. | 701/37 |
| 7,798,498 | B2 * | 9/2010 | Buma | 280/5.511 |

* cited by examiner

*Primary Examiner* — Yonel Beaulieu
(74) *Attorney, Agent, or Firm* — Quinn Law Group, PLLC

(57) ABSTRACT

A motor vehicle includes a body characterized by a center of gravity, a plurality of wheels for maintaining contact with a road surface, and a roll-reduction apparatus. The apparatus is configured to resist an impending rollover of the vehicle via at least one of i) applying a force between the body and at least one of the plurality of wheels and ii) lowering of the center of gravity of the vehicle. The vehicle also includes a sensing device configured to detect a roll moment acting on the vehicle and having a threshold magnitude. The vehicle additionally includes a controller configured to trigger the roll-reduction apparatus to generate a moment on the body opposite to the detected threshold moment such that an angle of the vehicle relative to the road surface during rollover is reduced. A method of reducing the angle of the body during rollover is also disclosed.

20 Claims, 5 Drawing Sheets

CONTROL OF VEHICLE ROLLOVER

TECHNICAL FIELD

The present disclosure relates to control of vehicle rollover.

BACKGROUND

A rollover is a type of vehicle accident in which a vehicle tips over onto its side or roof.

SUMMARY

A motor vehicle includes a vehicle body characterized by a center of gravity, a plurality of wheels for maintaining contact with a road surface, and a roll-reduction apparatus. The apparatus is configured to resist an impending rollover and counteract the tendency of the vehicle to roll via at least one of i) applying a force between the body and at least one of the plurality of wheels and ii) lowering of the center of gravity of the vehicle. The vehicle also includes a sensing device configured to detect a roll moment acting on the vehicle and having a threshold magnitude. The sensing device also generates a signal indicative of the roll moment having the threshold magnitude. The vehicle additionally includes a controller configured to trigger the roll-reduction apparatus in response to the signal to generate a moment on the vehicle body opposite to the detected threshold roll moment. The moment generated by the controller is configured to reduce an angle of the vehicle with respect to the road surface during the rollover.

The force between the body and the wheels may be applied via at least one actuator mounted per side of the vehicle body.

The vehicle may have four wheels, and one actuator may be mounted proximately to each wheel.

The sensing device may include a sensor arranged proximately to each wheel. Each sensor may be configured to detect the roll moment having the threshold magnitude at the respective wheel. Also, the controller may be configured to trigger each actuator in response to the detected threshold roll moment by the respective sensor.

Each of the plurality of wheels may include an inflatable tire mounted thereon. The center of gravity of such a vehicle may be lowered via deflating at least one tire. Furthermore, the sensing device may include a sensor arranged proximately to each tire. Each sensor may be configured to detect the roll moment having the threshold magnitude at the respective tire. Also, the controller may be configured to deflate a tire that is different from the tire with the detected threshold roll moment.

The roll-reduction apparatus may be configured to resist the impending rollover of the vehicle via applying the force between the body and at least one of the plurality of wheels and lowering of the center of gravity of the vehicle.

The vehicle may additionally include an axle. In such a case, the actuator may be arranged between the axle and the vehicle body.

The sensing device may be configured to sense at least one of a g-force acting on the vehicle and a roll-rate of the vehicle.

Also disclosed is a method of reducing the angle of the vehicle body during a rollover.

The above features and advantages and other features and advantages of the present invention are readily apparent from the following detailed description of the best modes for carrying out the invention when taken in connection with the accompanying drawings.

DETAILED DESCRIPTION

Figure 1:
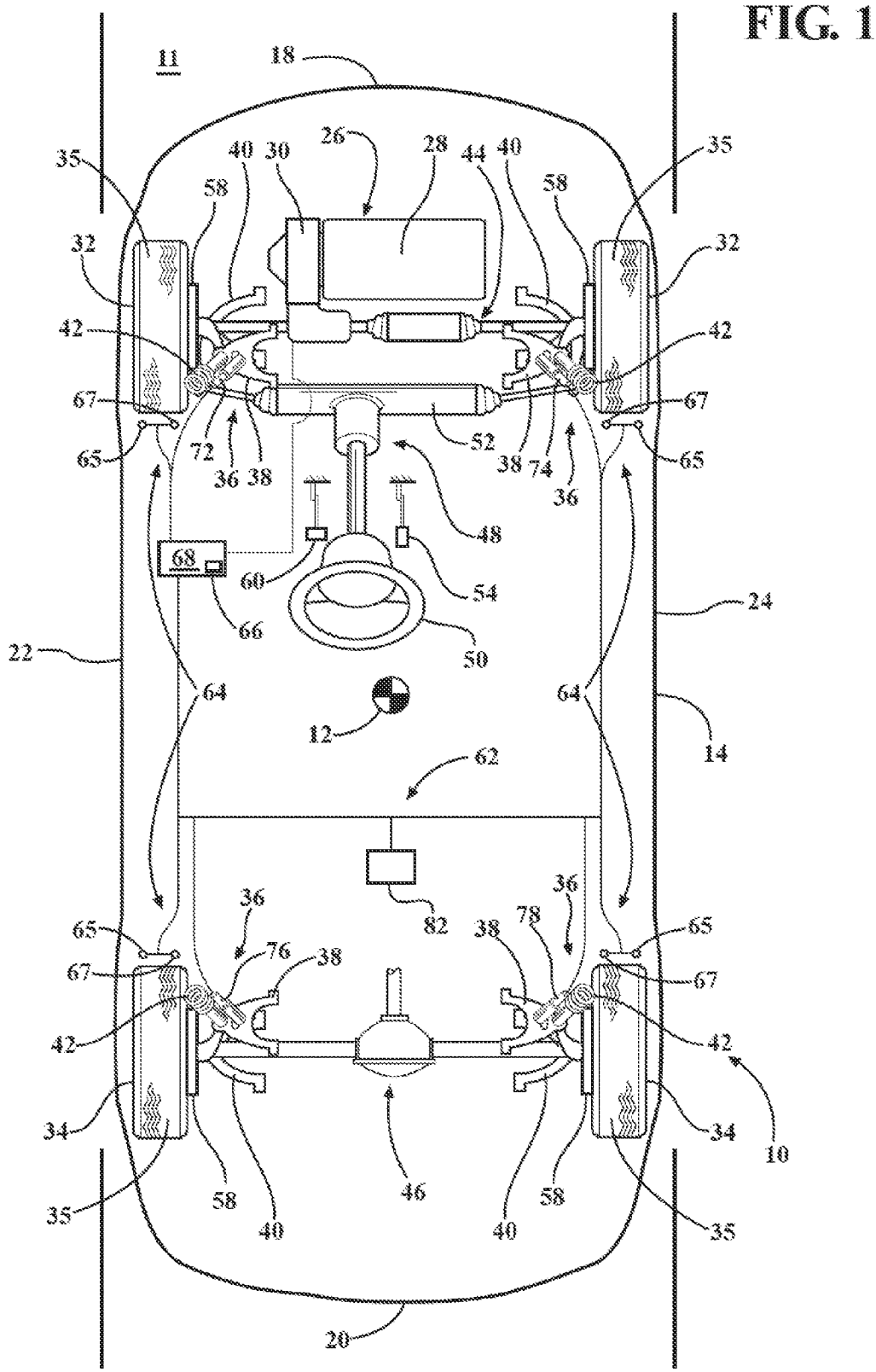
FIG. 1 is a schematic top view of a motor vehicle equipped with a roll-reduction apparatus.
Figure 2:
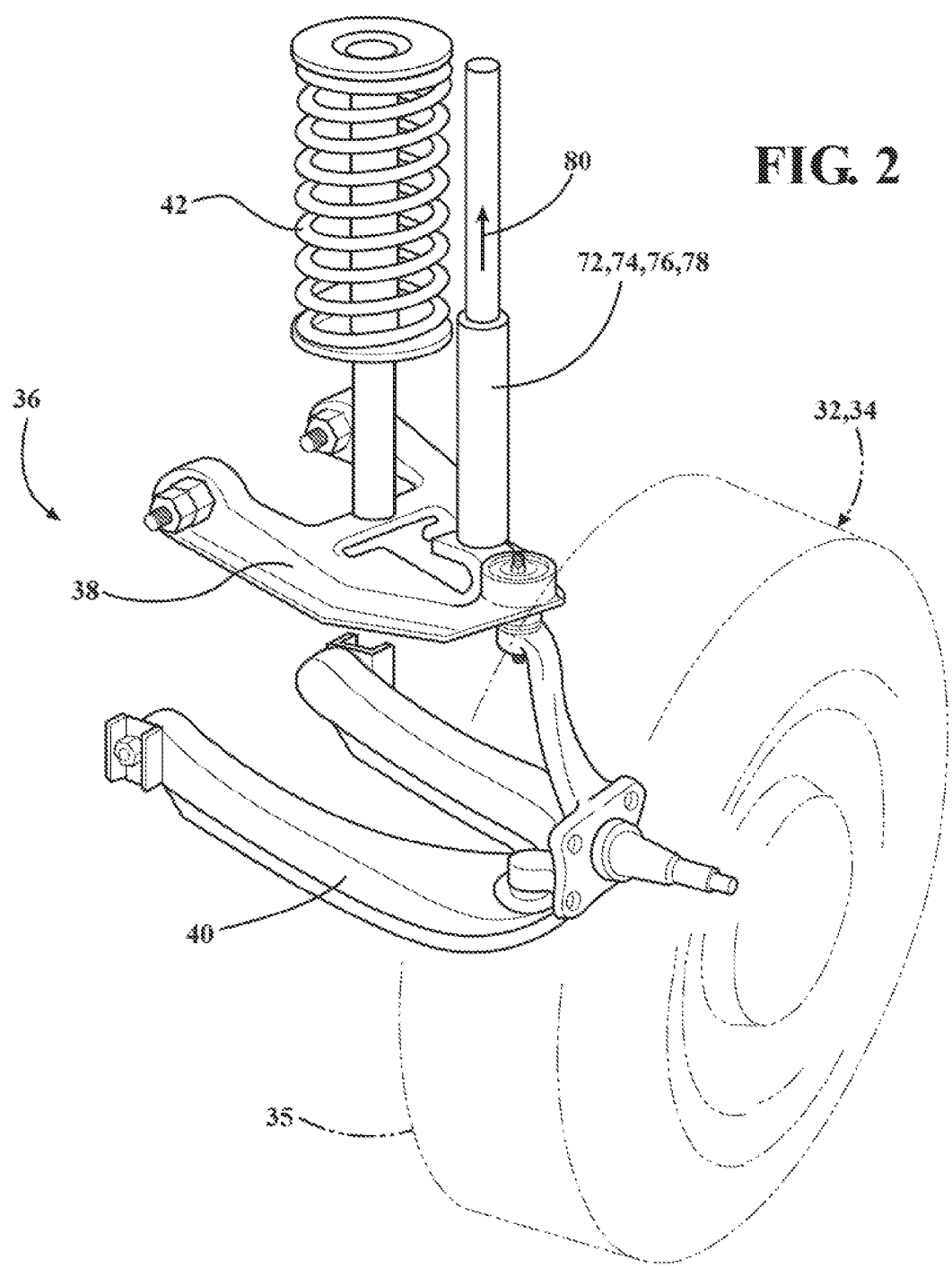
FIG. 2 is close up perspective view of a portion of a suspension of the vehicle equipped with a first embodiment of the roll-reduction apparatus shown in FIG. 1.

Referring to the drawings, wherein like reference numbers refer to like components, FIGS. 1 and 3-6 show a schematic view of a motor vehicle 10 positioned relative to a road surface 11. The vehicle 10 is characterized by a center of gravity designated by a numeral 12. The center of gravity 12 is positioned at a height 13 (shown in FIGS. 3-6) from the road surface 11. The vehicle includes a vehicle body 14. The vehicle body 14 defines a roof 16 (as shown in FIGS. 3-6) and four body sides. The four body sides include a front end 18, a rear end 20, a left side 22, and a right side 24. The vehicle body 14 may also include a vehicle frame (not shown).

The vehicle 10 also includes a powertrain 26 configured to propel the vehicle. As shown in FIG. 1, the powertrain 26 may include an engine 28 and a transmission 30. The powertrain 26 may also include one or more motor/generators as well as a fuel cell, neither of which are shown, but a powertrain configuration employing such devices is appreciated by those skilled in the art. The vehicle 10 also includes a plurality of wheels 32 and 34. As shown, the wheels 32 are positioned at the front end 18 and the wheels 34 are positioned at the rear end 20. Each of the plurality of wheels 32, 34 includes an inflatable tire 35 mounted thereon. Although four wheels 32, 34 with tires 35 are shown in FIG. 1, a vehicle with fewer or greater number of wheels and tires is also envisioned, for example having two wheels 32 at the front end 18 and one wheel 34 at the rear end 20.

As shown in FIG. 1, a vehicle suspension system 36 operatively connects the body 14 to the wheels 32 and 34 for maintaining contact between the wheels and a road surface, and for maintaining handling of the vehicle. The suspension system 36 may, for example, include an upper control arm 38, a lower control arm 40 and a strut 42 connected to each of the wheels 32, 34. Although a specific configuration of the suspension system 36 is shown in FIG. 1, other vehicle suspension designs are similarly envisioned. Thus suspended, the wheels 32 constitute a front axle 44, while the wheels 34 constitute a rear axle 46. Depending on specific configuration of the powertrain 26, power of the engine 28 may be transmitted to the road surface 11 through the either the front axle 44, the rear axle 46, or through both axles 44 and 46. The wheels 32, 34, tires 35, and the suspension system 36 affect the height 13 of the vehicle's center of gravity 12.

As also shown in FIG. 1, a vehicle steering system 48 is operatively connected to the front wheels 32 for steering the vehicle 10. The steering system 48 includes a steering wheel 50 that is operatively connected to the wheels 32 via a steering rack 52. The steering wheel 50 is arranged inside the passenger compartment of the vehicle 10, such that an operator of the vehicle may command the vehicle to assume a particular direction with respect to the road surface. Additionally, an accelerator pedal 54 is positioned inside the passenger compartment of the vehicle 10, wherein the accelerator pedal is operatively connected to the powertrain 26 for commanding propulsion of the vehicle 10.

As additionally shown in FIG. 1, a vehicle braking system is operatively connected to the wheels 32, 34 for decelerating the vehicle 10. The braking system includes a friction braking mechanism 58 at each of the wheels 32, 34. Although not shown in detail, it will be appreciated that each braking mechanism 58 may include a rotor, brake pads, and calipers. The calipers may be configured to hold the brake pads relative to the rotors, and to apply a force to the brake pads in order to squeeze the rotors for decelerating the vehicle 10. The force applied by the braking system is controlled via a brake pedal 60. The brake pedal 60 is positioned inside the passenger compartment of the vehicle 10, and is adapted to be controlled by the vehicle operator to reduce vehicle speed and retain control of the vehicle.

During operation of the vehicle 10, a situation may develop where the vehicle undergoes a dynamic weight transfer while traveling at an elevated speed that allows the vehicle to go into a skid. Such an out of control vehicle 10 may come across a low height obstruction, such as a curb. An out of control vehicle 10 may impact an object such as the aforementioned curb with one wheel 32 or 34, or with both wheels 32 and 34 along one side 22 or 24, while the remainder of the vehicle 10 tends to stay in motion. Accordingly, the point of contact between the low height obstruction and one wheel 32 and/or one wheel 34 may form a roll pivot for the vehicle 10. A vehicle 10 may also experience a skid while traversing a loose ground surface, such as gravel. In such an alternative situation, the vehicle's tires 35 may progressively dig into the loose ground surface and amass a berm of surface particles. Such a berm may in turn form a roll pivot that, similar to the impact with a low height obstruction described above, may create a roll pivot for the vehicle 10.

As shown in FIGS. 1-6, to deal with such potential rollover situations, the vehicle 10 also includes a roll-reduction apparatus 62. The roll-reduction apparatus 62 is provided for resisting an impending rollover of the vehicle 10 by reducing an angle 63 of the vehicle body 14 with respect to the road surface 11. The roll-reduction apparatus 62 is intended to either retain the vehicle 10 in an upright state or permit the vehicle to roll onto one of the body sides 22, 24. The roll-reduction apparatus 62 is configured to resist the impending rollover of the vehicle 10 via at least one of i) applying a force between the vehicle body 14 and at least one of the plurality of wheels 32, 34 and ii) lowering of the center of gravity 12 of the vehicle. Generally, after the impact or digging in of one or both wheels 32, 34, there are approximately 200-300 milliseconds available to alter the outcome, i.e., to affect the rollover of the vehicle 10, and, if the tipping of the vehicle cannot be reversed, to cause the vehicle to land on one of the sides 22, 24.

During a vehicle roll, the lateral acceleration acting on the vehicle generally exceed those which can be generated by the road-tire frictional interface of a typical street-legal passenger or utility vehicle (generally below 1.2 g). When vehicle wheels impact a rigid obstruction, the dominant force transfer point from the road surface to the vehicle is no longer dependent of the road-tire friction, but on the contact between the obstruction and the wheel. In such an impact with an obstruction, the lateral acceleration acting on the vehicle may spike into the 8-9 g range. When the vehicle tires dig into loose ground, the generated lateral acceleration acting on the vehicle will typically spike into the 2-3 g range. Accordingly, lateral forces during beginning stages of a rollover may be detected and employed to activate the roll-reduction apparatus 62 to reduce the roll rate and the resultant roll angle 63 in order to resist the rollover.

In order to detect the impending rollover, as shown in FIG. 1, the vehicle 10 additionally includes a sensing device 64. The sensing device 64 is configured to detect a roll moment acting on the vehicle body 14 and having a threshold magnitude 66. The roll moment of the vehicle 10 may be detected and its actual magnitude be ascertained from known lateral g-forces acting on the vehicle, and the height 13 of the vehicle's center of gravity 12. Accordingly, the sensing device 64 may include a set of sensors 65 and 67. As shown, one sensor 65 is mounted proximately to each wheel 32, 34 and is configured to detect the lateral g-forces acting on the vehicle. Additionally, one sensor 67 is mounted proximately to each wheel 32, 34 configured to determine a roll-rate of the vehicle 10, i.e., the speed with which the angle 63 changes when the vehicle 10 commences to tip. Thus, the sensors 65 and 67 are configured to sense vehicle parameters that are indicative of vehicle roll and facilitate the detection of the roll moment having the threshold magnitude 66.

The sensors 65 may be configured as accelerometers for measuring acceleration forces acting on the vehicle body 14 in the lateral, as well as vertical and fore-aft directions. Accordingly, one sensor 65 may sense the g-force acting near the front end 18 on the left side 22, a second sensor 65 may sense the g-force acting near the rear end 20 on the left side 22, while a third sensor 65 may sense the g-force acting near the front end 18 on the right side 24, and a fourth sensor 65 may sense the g-force acting near the rear end 20 on the right side 24.

With continued reference to FIG. 1, the vehicle 10 also includes a controller 68. The controller 68 is configured to receive from the sensors 65 and 67 the data indicative of the sensed g-forces acting on the vehicle 10 and the roll-rate of the vehicle. Additionally, the controller 68 is programmed to recognize when the sensed g-forces are indicative of the roll moment having the threshold magnitude 66 and in response trigger the roll-reduction apparatus 62. Thus triggered, the roll-reduction apparatus 62 generates a moment on the vehicle body 14 opposite to the detected roll moment having the threshold magnitude 66. Furthermore, the moment generated on the vehicle body 14 by having the controller 68 trigger the roll-reduction apparatus 62 is intended to reduce the angle 63 of the vehicle 10 with respect to the road surface 11 during the rollover. The controller 68 may be a central processing unit that is also programmed to regulate the operation of the powertrain 26, as well as stability control and anti-lock braking systems which are not shown but known to those skilled in the art.

As shown in FIGS. 1-4, the roll-reduction apparatus 62 may include actuators 72, 74, 76, and 78. The actuators 72, 74, 76, and 78 are configured to apply a force 80 (shown in FIGS. 2 and 4) between the vehicle body 14 and the wheels 32, 34. The actuators 72-78 may by actuated by a compressed gas, such as air or nitrogen, or a hydraulic fluid. In such a case, the controller 68 may be operatively connected to a fluid compressor 82, and be programmed to regulate the compressor to recharge the actuators. The actuators 72-78 may also be charged with reactants that are configured to generate the force via a chemical reaction in order to counter the roll moment having the threshold magnitude 66 sensed by the sensing device 64. Such a chemical reaction may be accompanied by combusting the reactants inside the actuator(s) 72, 74, 76, and/or 78 in order to generate a higher magnitude of the force 80. In such a case, the controller 68 may be programmed to initiate combustion of the reactants inside the respective actuator 72-78. Overall, any manner of generating a force between the body 14 and the wheels 32, 24 is deemed appropriate for countering the sensed roll moment having the threshold magnitude 66 acting on the vehicle 10.

Figure 3:
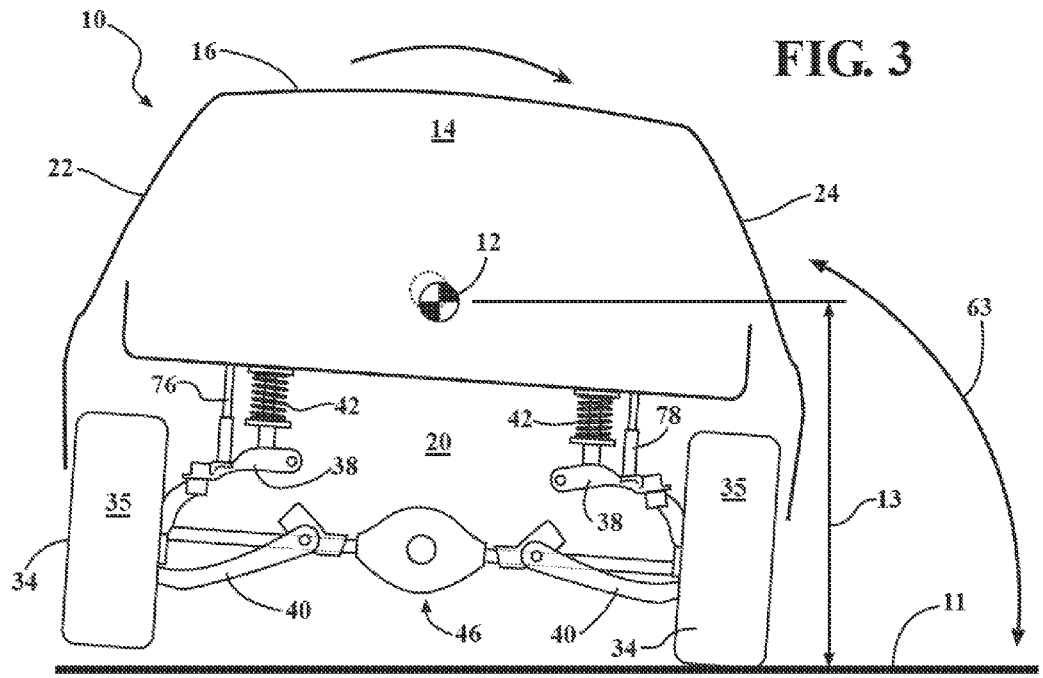
FIG. 3 is a schematic rear view of the vehicle shown in FIG. 1 shown employing the first embodiment of the roll-reduction apparatus during initial stages of rollover.
Figure 4:
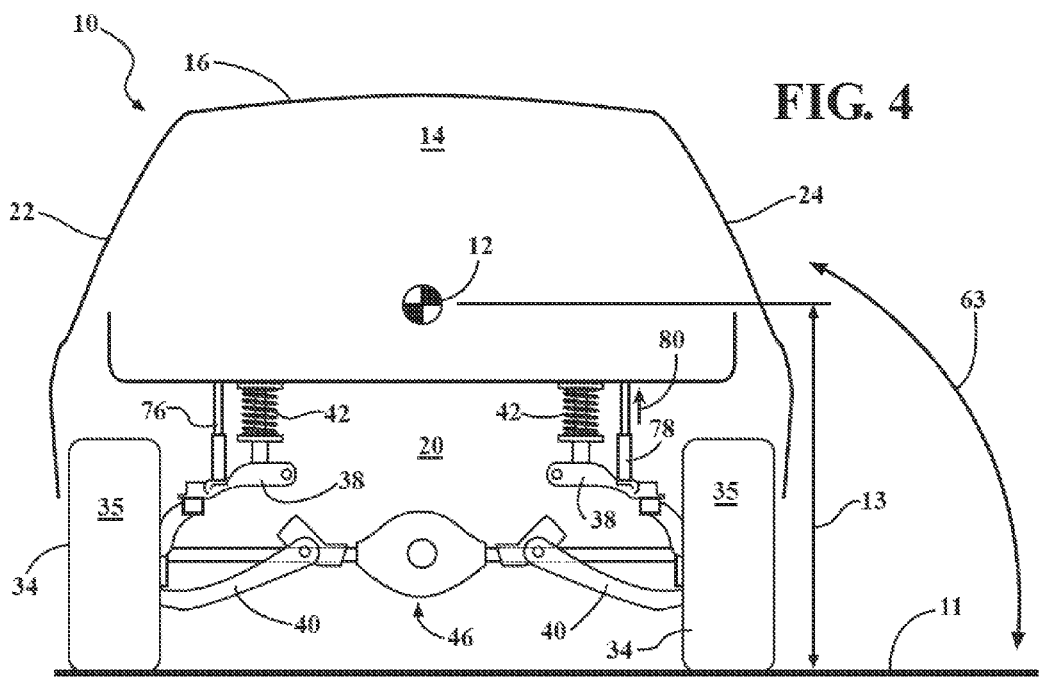
FIG. 4 is a schematic rear view of the vehicle shown in FIG. 1 with the first embodiment of the roll-reduction apparatus activated to reduce vehicle roll angle.
Figure 5:
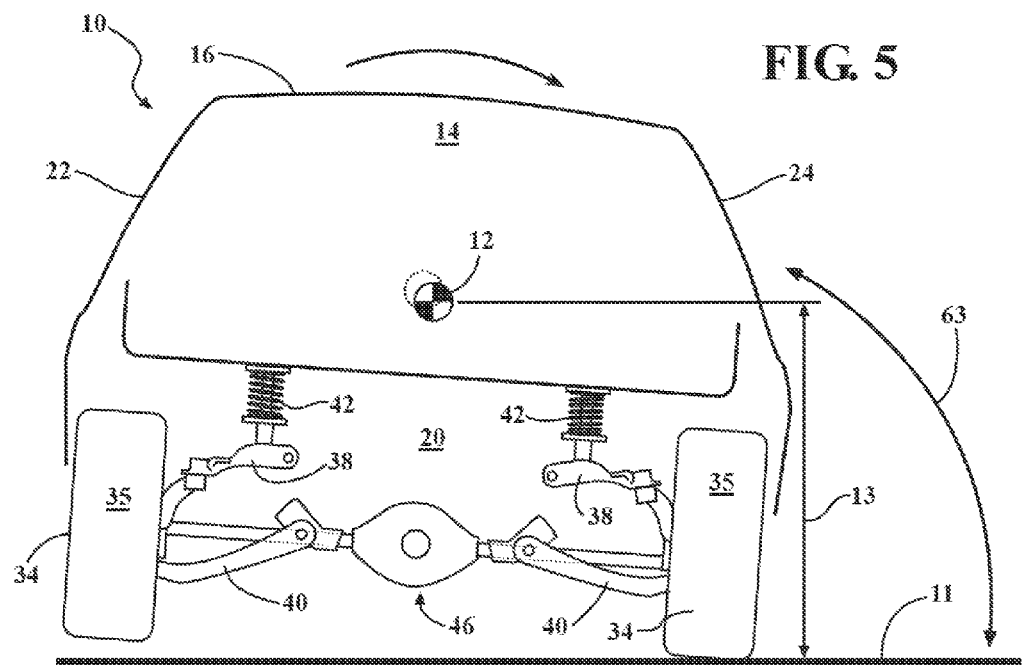
FIG. 5 is a schematic rear view of the vehicle shown in FIG. 1 shown employing a second embodiment of the roll-reduction apparatus during initial stages of rollover.

As shown, the actuators 72 and 74 may be mounted proximately to each wheel 32, such that the actuator 72 is configured to apply the force 80 to the body 14 proximately the front end 18 on the left side 22 and actuator 74 is capable of applying the force 80 to the body 14 proximately the front end 18 on the right side 24. As also shown, the actuators 76 and 78 may be mounted proximately to each wheel 34, such that the actuator 76 is configured to apply the force 80 to the body 14 proximately the rear end 20 on the left side 22, and the actuator 78 is capable of applying the force 80 to the body 14 proximately the rear end 20 on the right side 24. Furthermore, in order to apply the force 80 in an efficient manner, each actuator 72, 74 may be arranged between the vehicle body 14 and the axle 44, while each actuator 76, 78 may be arranged between the vehicle body and the axle 46. As shown in FIGS. 3-4, each actuator 72, 74, 76, and 78 may be positioned between the vehicle body 14 and the respective upper control arm 38. Although one actuator 72-78 is depicted near each wheel 32 or 34, only a single actuator may be employed per each side 18, 20, 22, and 24, or only a single actuator may be employed on the left side 22 and a single actuator on the right side 24 of the vehicle body 14.

The controller 68 may be configured to selectively trigger each actuator 72, 74, 76, 78 in response to the detected threshold roll moment by the respective sensors 65 and 67. Generally, the controller 68 selects and triggers at least one of the actuators 72-78 that is on the side of the vehicle body 14 where the roll moment having the threshold magnitude 66 is detected. For example, if the roll moment having the threshold magnitude 66 is detected at the wheel 32 on the left side 22, the actuator 72 will be triggered. Furthermore, depending on predetermined dynamic behavior of the vehicle 10 in such a situation, the actuator 76 may be triggered as well. In a situation where the actuators 72-78 are capable of generating a variable force, the controller 68 may also be configured to regulate the force generated by the actuators.

Figure 6:
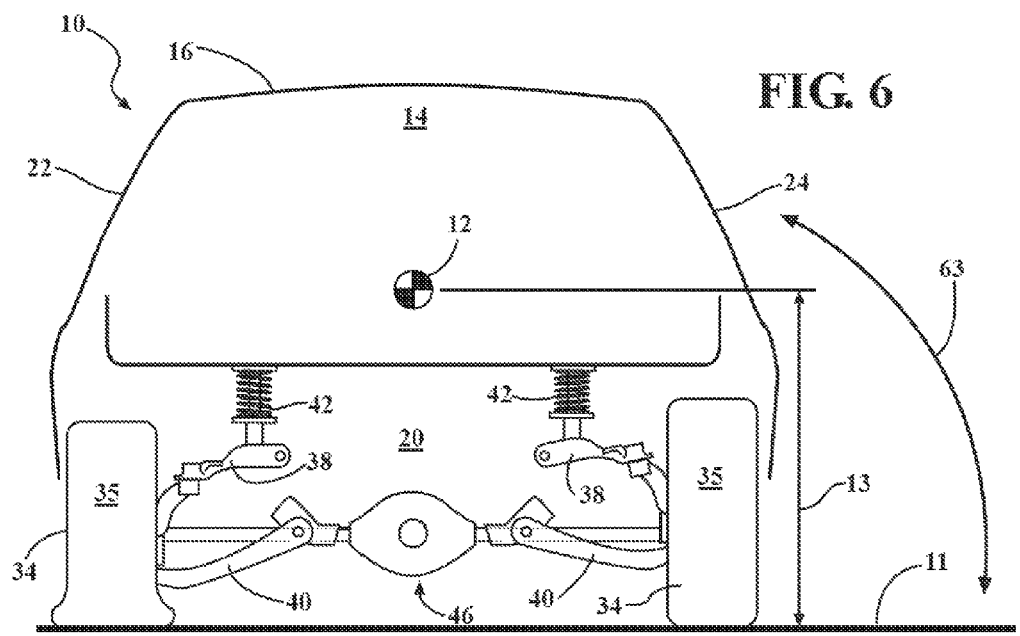
FIG. 6 is a schematic rear view of the vehicle shown in FIG. 1 with the second embodiment of the roll-reduction apparatus activated to reduce vehicle roll angle.

As shown in FIG. 6, the roll-reduction apparatus 62 may also be configured to selectively deflate tires 35 upon detection of the roll moment having the threshold magnitude 66 at a specific wheel 32 or 34. Accordingly, the controller 68 may be configured to trigger deflation of at least one tire 35 that is different from the tire experiencing the roll moment having the threshold magnitude 66. The selection of the tire 35 to be deflated would depend on predetermined dynamic behavior of the vehicle 10 in such a situation. Generally, the tire 35 selected for deflation would be on the side of the vehicle body 14 that is opposite to the side on which the roll moment having the threshold magnitude 66 is detected. For example, if the roll moment having the threshold magnitude 66 is detected at the front end 18 on the left side 22, the tire 35 at the front end 18 on the right side 24 and/or the tire at the rear end 20 on the right side 24 will be deflated to counteract the roll. Specifically, FIG. 6 illustrates one tire 35 being deflated on the wheel 34 of the left side 22 as the vehicle 10 attempts to roll over toward the right side 24, thus reducing the roll angle 63.

Although a number of exemplary situations and uses are described above, in general, however, the roll-reduction apparatus 62 may include the use of both the actuators 72-78 and deflating the appropriate tires 35 during the sensed tilt of the vehicle 10 and its impending rollover. The roll-reduction apparatus 62 may be used in any various combinations to assist in keeping the vehicle 10 upright or, if the roll cannot be stopped, to reduce the roll angle 63 and permit the vehicle to roll onto one of the body sides 22, 24.

Figure 7:
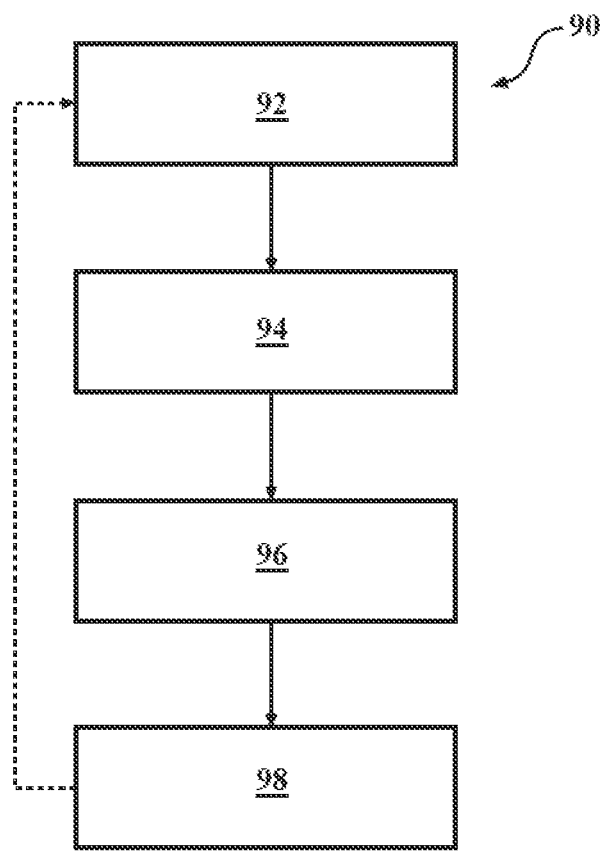
FIG. 7 is a flow chart illustrating a method of reducing an angle of the vehicle with respect to a road surface during rollover.

FIG. 7 depicts a method or routine 90 of reducing the angle 63 of the body 14 of the vehicle 10 with respect to the road surface 11 during a rollover, as described with respect to FIGS. 1-6. The method commences in frame 92 with the vehicle 10 traveling along the road surface 11. From frame 92, the method proceeds to frame 94, where the method includes detecting via the sensing device 64 the roll moment having the threshold magnitude 66. Following frame 94, the method proceeds to frame 96. In frame 96, the method includes communicating the detected roll moment having the threshold magnitude 66 to the controller 68.

From frame 96 the method proceeds to frame 98, where the method includes triggering via the controller 68 the roll-reduction apparatus 62 to generate a moment on the body 14 opposite to the detected roll moment having the threshold magnitude 66. As described with respect to FIGS. 1-6, the roll-reduction apparatus 62 is configured to resist an impending rollover of the vehicle 10 via at least one of i) applying a force between the vehicle body 14 and at least one of the plurality of wheels 32, 34 and ii) lowering the center of gravity 12 of the vehicle. As additionally described above, the roll-reduction apparatus 62 may include the use of the actuators 72-78 and/or deflating the appropriate tires 35 during the sensed impending rollover. Following frame 98, the method may loop back to frame 92.

By resisting the impending rollover, the method 90 is intended to reduce the roll angle 63 in order to counteract the tendency of the vehicle 10 to roll. If the rollover cannot be avoided entirely by triggering the roll-reduction apparatus 62, the reduced angle 63 will tend to land the vehicle 10 on one of its sides 22, 24.

While the best modes for carrying out the invention have been described in detail, those familiar with the art to which this invention relates will recognize various alternative designs and embodiments for practicing the invention within the scope of the appended claims.

The invention claimed is:

1. A motor vehicle characterized by a center of gravity, comprising:
   a vehicle body;
   a plurality of wheels for maintaining contact with a road surface;
   a roll-reduction apparatus configured to resist an impending rollover of the vehicle via at least one of i) applying a force between the vehicle body and at least one of the plurality of wheels and ii) lowering of the center of gravity of the vehicle;
   a sensing device configured to detect a roll moment acting on the vehicle and having a threshold magnitude; and
   a controller configured to trigger the roll-reduction apparatus to generate a moment on the vehicle body opposite to the detected roll moment having the threshold magnitude such that an angle of the vehicle with respect to the road surface during the rollover is reduced.

2. The vehicle of claim 1, further comprising a plurality of actuators, wherein the roll-reduction apparatus is configured to resist the impending rollover via applying the force, and wherein the force between the body and the wheels is applied via at least one of the plurality of actuators mounted per side of the vehicle body.

3. The vehicle of claim 2, wherein the plurality of wheels is four, and one of the plurality of actuators is mounted proximately to each wheel.

4. The vehicle of claim 3, wherein the sensing device includes a sensor arranged proximately to each wheel and configured to detect the roll moment having the threshold magnitude at the respective wheel, and wherein the controller is configured to trigger each of the plurality of actuators in response to the detected threshold roll moment by the respective sensor.

5. The vehicle of claim 1, wherein each of the plurality of wheels includes an inflatable tire mounted thereon, and wherein the center of gravity of the vehicle is lowered via deflating at least one tire.

6. The vehicle of claim 5, wherein the sensing device includes a sensor arranged proximately to each tire, wherein each sensor is configured to detect the roll moment having the threshold magnitude at the respective tire, and wherein the controller is configured to deflate a tire that is different from the tire with the detected threshold roll moment.

7. The vehicle of claim 1, wherein the roll-reduction apparatus is configured to resist the impending rollover of the vehicle via applying the force between the body and at least one of the plurality of wheels and lowering of the center of gravity of the vehicle.

8. The vehicle of claim 1, further comprising an axle, wherein the actuator is arranged between the axle and the vehicle body.

9. The vehicle of claim 1, wherein the sensing device is configured to sense at least one of a g-force acting on the vehicle and a roll-rate of the vehicle.

10. A method of reducing an angle of a vehicle body with respect to a road surface during a rollover, the vehicle characterized by a center of gravity and having a plurality of wheels for maintaining contact with the road surface, the method comprising:
  detecting via a sensing device mounted on the vehicle a roll moment acting on the vehicle and having a threshold magnitude;
  communicating the detected roll moment having the threshold magnitude to a controller; and
  triggering via the controller a roll-reduction apparatus mounted on the vehicle body to generate a moment on the vehicle body opposite to the detected roll moment having the threshold magnitude;
  wherein the roll-reduction apparatus is configured to resist an impending rollover of the vehicle via at least one of i) applying a force between the vehicle body and at least one of the plurality of wheels and ii) lowering the center of gravity of the vehicle.

11. The method of claim 10, further comprising a plurality of actuators, wherein the roll-reduction apparatus is configured to resist the impending rollover via applying the force, and wherein said applying a force between the vehicle body and the wheels is accomplished via at least one of the plurality of actuators mounted per side of the vehicle body.

12. The method of claim 11, wherein the plurality of wheels is four, and one of the plurality of actuators is mounted proximately to each wheel.

13. The method of claim 12, wherein the sensing device includes a sensor arranged proximately to each wheel, further comprising detecting the roll moment having the threshold magnitude via each sensor at the respective wheel, and triggering via the controller each of the plurality of actuators in response to the detected threshold roll moment by the respective sensor.

14. The method of claim 10, wherein each of the plurality of wheels includes an inflatable tire mounted thereon, and wherein said lowering of the center of gravity of the vehicle is accomplished via deflating at least one tire.

15. The method of claim 14, wherein the sensing device includes a sensor arranged proximately to each tire, further comprising detecting the roll moment having the threshold magnitude via each sensor at the respective tire, and deflating via the controller a tire that is different from the tire with the detected threshold roll moment.

16. The method of claim 10, wherein the roll-reduction apparatus is configured to resist the impending rollover of the vehicle via applying the force between the vehicle body and at least one of the plurality of wheels and lowering of the center of gravity of the vehicle.

17. The method of claim 10, wherein the vehicle includes an axle, and wherein the actuator is arranged between the axle and the vehicle body.

18. The method of claim 10, wherein said detecting via the sensing device the roll moment includes sensing at least one of a g-force acting on and a roll-rate of the vehicle.

19. A motor vehicle characterized by a center of gravity, comprising:
  a vehicle body;
  a plurality of wheels for maintaining contact with a road surface, wherein each of the plurality of wheels includes an inflatable tire mounted thereon;
  a roll-reduction apparatus configured to resist an impending rollover of the vehicle via at least one of i) applying a force between the vehicle body and at least one of the plurality of wheels and ii) lowering of the center of gravity of the vehicle;
  a sensing device configured to detect a roll moment acting on the vehicle and having a threshold magnitude;
  a controller configured to trigger the roll-reduction apparatus to generate a moment on the vehicle body opposite to the detected roll moment having the threshold magnitude such that an angle of the vehicle with respect to the road surface during the rollover is reduced; and
  a plurality of actuators;
  wherein:
    at least one of the plurality of actuators is mounted proximately to each wheel and the force between the body and the wheels is applied via at least one of the plurality of actuators; and
    the sensing device includes a sensor arranged proximately to each wheel and each sensor is configured to detect the roll moment having the threshold magnitude at the respective wheel.

20. The vehicle of claim 19, wherein the application of the force between the body and the wheels is applied via an actuator mounted proximately to each wheel, and wherein the center of gravity of the vehicle is lowered via deflating at least one tire.

* * * * *